United States Patent [19]
Wourms

[11] Patent Number: 5,755,310
[45] Date of Patent: May 26, 1998

[54] RATCHET LIFTING NUT ASSEMBLY

[75] Inventor: Richard J. Wourms, Brookville, Ohio

[73] Assignee: Joyce/Dayton Corporation, Kettering, Ohio

[21] Appl. No.: 715,125

[22] Filed: Sep. 17, 1996

[51] Int. Cl.$^6$ ........................................ B66B 9/02
[52] U.S. Cl. ............................... 187/267; 254/98
[58] Field of Search .................... 187/267, 268, 187/210; 254/98, 103; 24/424.8 R, 424.8 B

[56] References Cited

U.S. PATENT DOCUMENTS

| | | | |
|---|---|---|---|
| 2,218,319 | 10/1940 | Pfauser | 254/98 |
| 3,309,060 | 3/1967 | Villars | 254/7 |
| 3,323,777 | 6/1967 | McMullen | 254/103 |
| 3,687,234 | 8/1972 | Gendreau | 187/25 |
| 4,279,329 | 7/1981 | Gehron | 187/25 |
| 4,921,218 | 5/1990 | Andre | 254/98 |
| 4,962,674 | 10/1990 | Payne | 74/89.15 |

*Primary Examiner*—Kenneth Noland
*Attorney, Agent, or Firm*—Biebel & French

[57] ABSTRACT

A screw-type lift having a ratchet lifting nut assembly providing for the safe lowering of a load while preventing additional lifting of the load upon failure of a lifting nut is disclosed. The ratchet lifting nut assembly includes a lifting nut and an auxiliary nut threadably engaging a lifting screw and a wear gap separating the lifting nut from the auxiliary nut. A ratchet portion is supported on the auxiliary nut and is aligned for engagement with a pawl supported on the lifting nut. During a normal mode of operation, the lifting nut supports the entire weight of a load and the ratchet portion and pawl cooperate to restrain rotational movement of the auxiliary nut relative to the lifting nut. A failure mode of operation is defined when the lifting nut is excessively worn in that it can no longer safely support the load. In this mode, the wear gap is eliminated wherein the auxiliary nut is supported on the lifting nut and the load is supported solely by the auxiliary nut. The ratchet portion and the pawl cooperate to restrain rotational movement of the auxiliary nut relative to the lifting nut in a first direction permitting the lowering of the load, while the auxiliary nut is permitted to rotate relative to the lifting nut in a second direction preventing the raising of the load. Therefore, when the lifting nut fails, the load may be safely lowered but the ratchet lifting nut assembly will prevent any further lifting of the load.

12 Claims, 5 Drawing Sheets

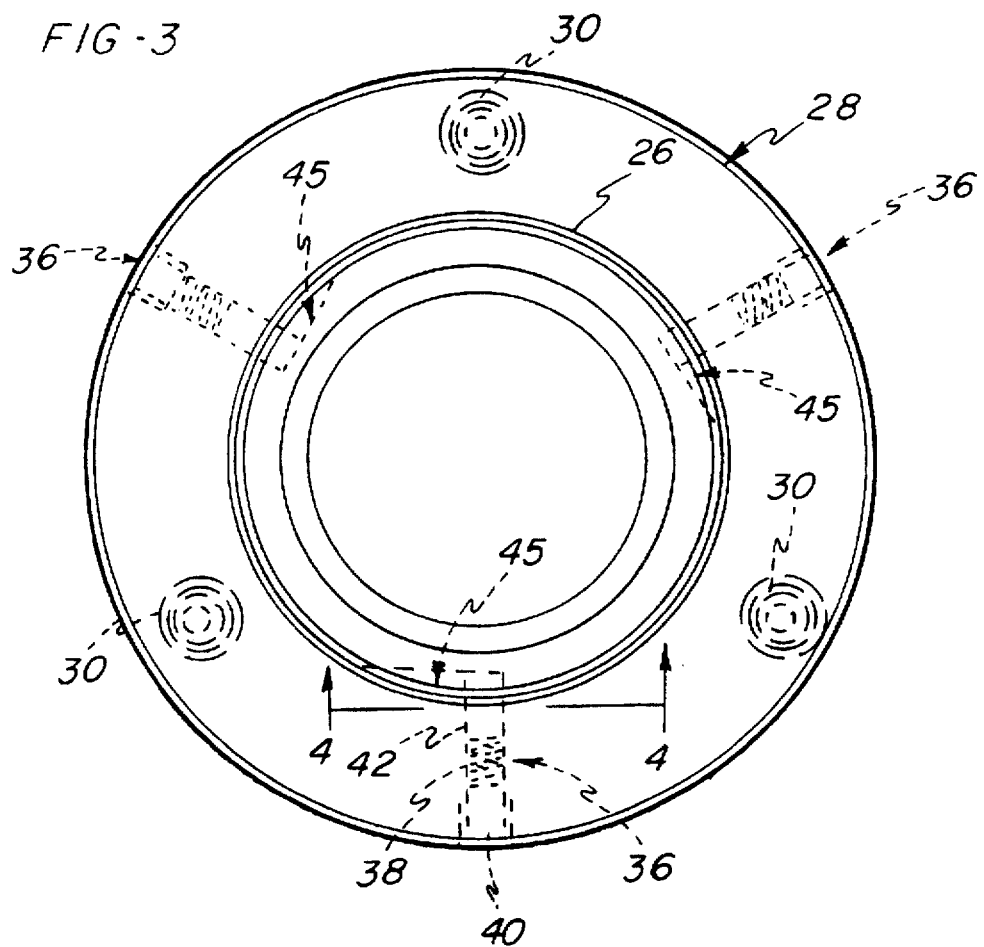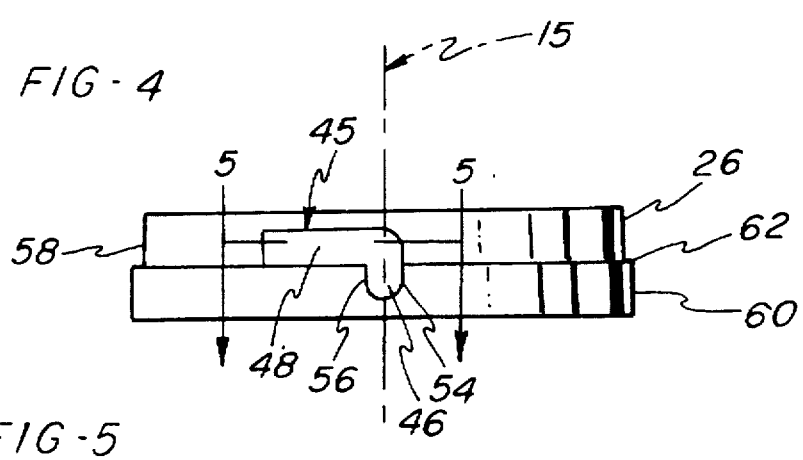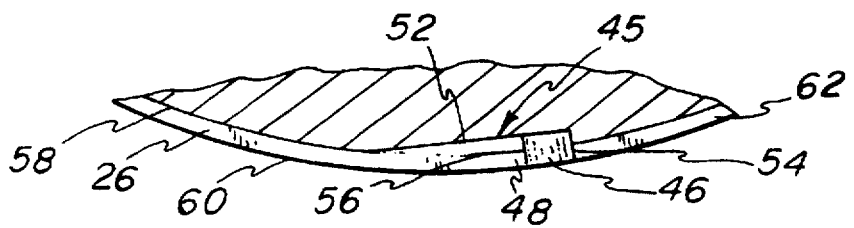

RATCHET LIFTING NUT ASSEMBLY

BACKGROUND OF THE INVENTION

1. Field of the Invention

The present invention relates to lifts of the type used for lifting heavy loads, and more particularly, to a lifting nut assembly providing for the safe operation of a screw-type lift.

2. Description of the Prior Art

Heavy objects, such as vehicles, are commonly lifted or raised by devices called lifts. Such lifts usually have a lifting mechanism that may operate by a variety of mechanical components, including but not limited to levers, lifting screws, or hydraulic cylinders. In a typical screw-type lift, a lifting screw is rotated wherein the lifting screw moves vertically relative to a threadably engaged lifting nut. The lifting nut may be held stationary whereby the lifting screw moves vertically when rotated. Alternatively, the lifting screw may be rotatably mounted in a manner preventing its vertical movement, thereby causing the lifting nut to rise or fall in response to rotation of the lifting screw. However, the lifting screw may be fixed from both rotational and vertical movement wherein the lifting nut is rotated by an external source causing vertical movement of the lifting nut relative to the lifting screw.

Usually the lifting nut is made of a material softer than that of the lifting screw. The threads of the lifting nut will therefore wear more rapidly in use than those of the lifting screw. After a certain period of operation, the threads of the lifting nut will wear out thus diminishing the connection between the jack screw and lifting nut. Eventually, as threads become excessively worn, the lifting nut will fail thereby causing the load to drop in an uncontrolled manner. The rate of lifting nut wear depends upon a number of factors and the resultant failure of the lifting nut is usually not readily anticipated.

It is well known in the art to install a safety nut in addition to the lifting nut to prevent the load from falling uncontrollably in the event of lifting nut failure. Under normal operating conditions, no load is applied to the safety nut and as a result, the safety nut is not subjected to wear. The safety nut is designed to carry the load only in a failure mode of operation wherein the lifting nut fails because of excessive thread wear. Typical safety nuts allow for the continued use of the lift for the raising and lowering objects after the failure of the lifting nut. As the safety nut continues to support the load, the safety nut threads will eventually become worn. When the threads of the safety nut become sufficiently worn, the safety nut may fail thereby causing the load to uncontrollably drop.

For additional safety, it has been proposed to provide a safety nut that will not allow the continued operation of the lift after the lifting nut has failed. Such safety nut devices are designed to disable the lift and prevent all vertical movement of the load upon failure of the lifting nut. This often results in the dangerous situation of having an elevated load that can not be lowered.

In response to these problems, arrangements have been disclosed wherein, after lifting nut failure, a raised load may be lowered by means of the safety nut but any further operation would be prevented. An example of such a safety device is disclosed in U.S. Pat. No. 4,279,329 to Gehron. The Gehron patent discloses a lifting device wherein a safety nut supports a lifting nut upon excessive wear of the lifting nut threads. A lock nut is located below the safety nut and these two nuts are connected by a spring mechanism. The Gehron device provides that when the safety nut supports the lifting nut further lifting of the load is prevented while safe lowering of the load is allowed. However, the Gehron device, as well as many other prior art safety nut devices, result in complex and expensive arrangements.

Accordingly, there is a need for a lift having a simple and inexpensive lifting nut assembly for permitting the safe lowering of a load, while preventing further lifting of the load, when the threads of the lifting nut are excessively worn.

SUMMARY OF THE INVENTION

The present invention provides a screw-type lift having a lifting nut assembly for permitting the safe lowering of a load while preventing the further raising of the load once the threads of a lifting nut have failed.

In accordance with the present invention, a lifting nut assembly for a screw-type lift is disclosed which includes a lifting nut and an auxiliary nut threadably engaging a lifting screw and a wear gap separating the lifting nut from the auxiliary nut. A spring-biased pawl is supported on the lifting nut and aligned for engagement with a ratchet portion supported on the auxiliary nut. The ratchet portion and the pawl cooperate to restrain the auxiliary nut from rotating relative to the lifting nut in a normal mode of operation during which, the weight of the load will be supported entirely by the lifting nut. After extended use, as the threads of the lifting nut become worn, the lifting nut and auxiliary nut move towards each other thereby reducing the size of the wear gap.

Eventually, the threads of the lifting nut reach a point of failure where they can no longer support the load. During this failure mode of operation, the wear gap is eliminated and the auxiliary nut contacts the lifting nut. The lifting nut threads no longer support any weight so that the auxiliary nut carries the entire load. The ratchet portion and the pawl cooperate to restrain rotational movement of the auxiliary nut relative to the lifting nut in one direction wherein the load may be safely lowered. However, the ratchet portion and the pawl allow relative rotational movement between the auxiliary nut and lifting nut in a second opposite direction thereby preventing the load from being lifted.

Therefore, it is an object of the present invention to provide a screw-type lift having a lifting nut assembly for preventing the uncontrolled lowering of a load upon failure of the lifting nut.

It is a further object of the present invention to provide such a lifting nut assembly for permitting the safe lowering of a load when the lifting nut fails.

It is yet another object of the present invention to provide such a lifting nut assembly for preventing the raising of a load after the lifting nut fails.

Other objects and advantages of the invention will be apparent from the following description, the accompanying drawings and the appended claims.

BRIEF DESCRIPTION OF THE DRAWINGS

FIG. 3 is a top view of the lifting nut assembly of the present invention taken along line 3—3 in FIG. 1;

FIG. 4 is a side view of the auxiliary nut of the present invention taken along the line 4—4 in FIG. 3;

FIG. 5 is a partial top sectional view of the slot structure of the auxiliary nut taken along line 5—5 in FIG. 4;

DETAILED DESCRIPTION OF THE PREFERRED EMBODIMENT

Figure 1:
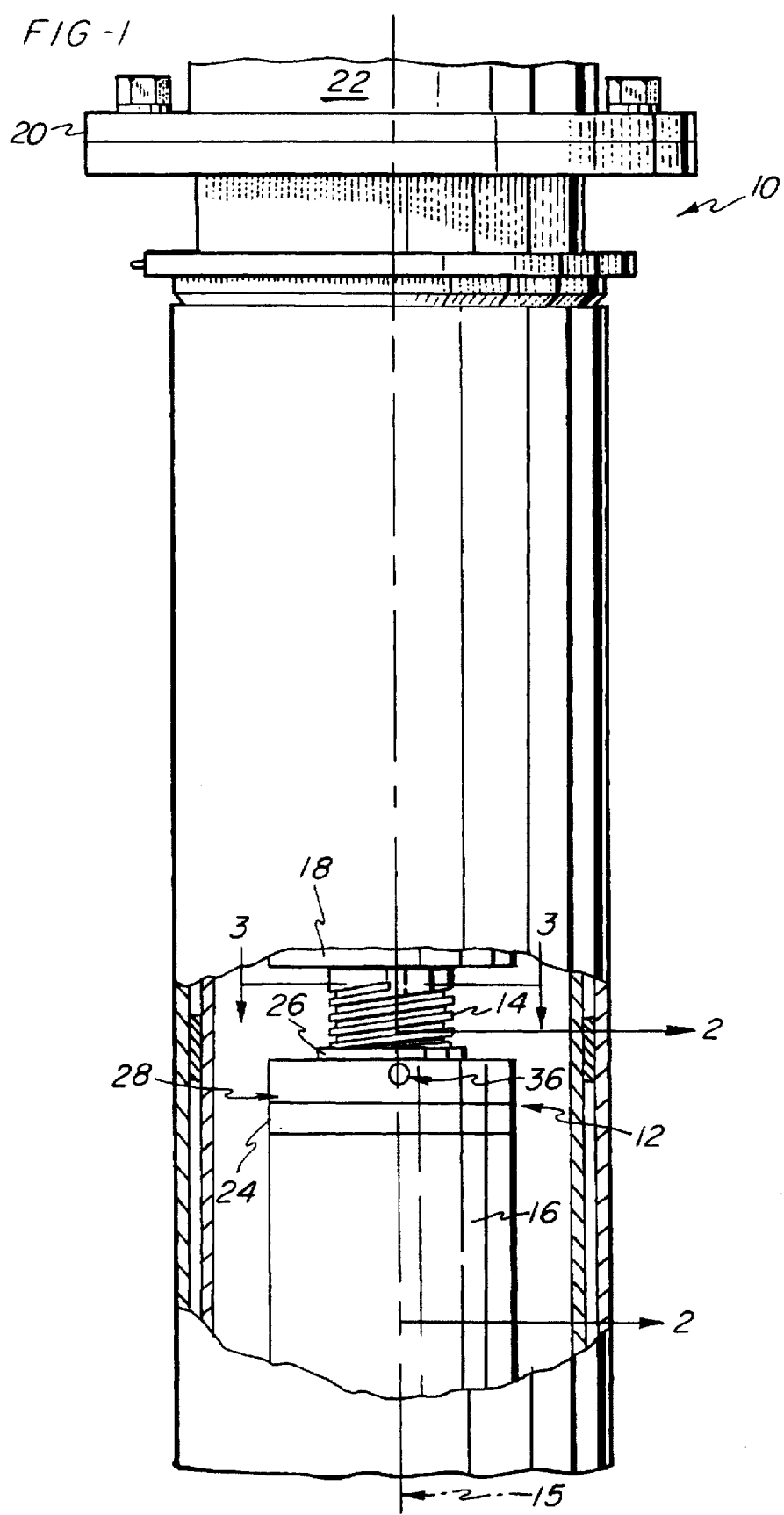
FIG. 1 is a front view with a partial cut-away of a lift incorporating the lifting nut assembly of the present invention.
Figure 2:
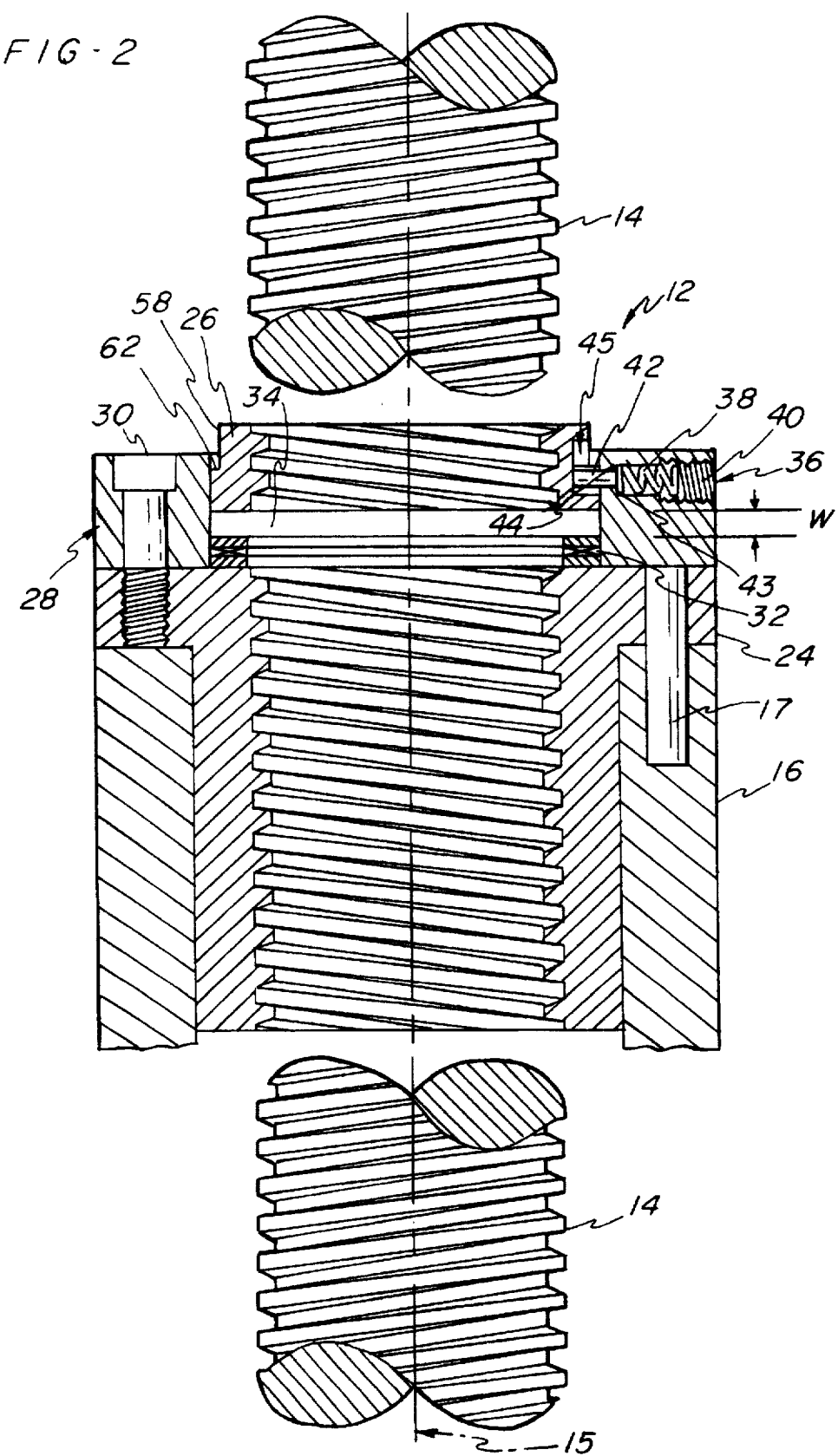
FIG. 2 is a side sectional view of the lifting nut assembly of the present invention taken along the line 2—2 in FIG. 1, illustrating the assembly in a normal mode of operation.

Referring initially to FIG. 1, the present invention comprises a lift 10 including a lifting nut assembly 12 threadably engaging a lifting screw 14 having a longitudinal screw axis 15. The lifting nut assembly 12 is supported on a support tube 16 which is vertically disposed concentric to the lifting screw 14. A series of pins 17 restrain rotational movement of the lifting nut assembly 12 relative to the support tube 16. (FIG. 2). The upper end of the lifting screw 14 is driven in rotation by a motor 18 thereby raising and lowering the lifting screw 14 relative to the lifting nut assembly 12. A lifting ram 20 for supporting a load 22 is connected to the motor 18 and moves vertically in cooperation with the lifting screw 14.

Referring to FIGS. 1 and 2, the lifting nut assembly 12 includes a first or lifting nut 24, a second or auxiliary nut 26, and a mounting ring 28. The lifting nut 24 threadably engages the lifting screw 14 and is attached to the upper end of the support tube 16 by pins 17 thereby preventing movement of the lifting nut 24 in response to rotation of the lifting screw 14. As illustrated in FIGS. 2 and 3, the mounting ring 28 is connected to the upper surface of the lifting nut 24 by a plurality of bolts 30 of the type well known in the art. A thrust bearing 32 is located within the mounting ring 28 wherein the lower surface of the thrust bearing 32 contacts the upper surface of the lifting nut 24.

Turning again to FIG. 2, the auxiliary nut 26 threadably engages the lifting screw 14 and is located within the mounting ring 28 a predetermined distance "w" above the thrust bearing 32. The predetermined distance "w" defines a wear gap 34 and is calculated based upon the root of the threads of the lifting nut 24 so that when a permissible maximum wear of the threads of the lifting nut 24 is equaled or exceeded, the auxiliary nut 26 is supported on the thrust bearing 32. In particular, the predetermined distance "w" typically equals the root of the threads which is well known in the art as the surface of a thread which joins the flanks of adjacent thread forms and is immediately adjacent to the cylinder or cone from which the thread projects.

A plurality of pawls 36 are radially disposed about the mounting ring 28. (FIG. 3). Each pawl comprises a spring 38 compressed between an outside set screw 40 and an inside pin 42. The spring 38 exerts a radial inward force to bias the pin 42 toward the auxiliary nut 26. Each pin 42 may be formed with a shoulder portion 43 for engaging a contact surface 44 on the mounting ring 28. Should the auxiliary nut 26 be removed from the mounting ring 28, the spring 38 will force the pin 42 radially inwardly until the shoulder portion 43 engages the contact surface 44 thereby preventing the pin 42 from being ejected from the mounting ring 28.

The auxiliary nut 26 includes a ratchet portion defined by a plurality of slot structures 45 as illustrated in FIGS. 3–5. Each slot structure 45 is adapted for engaging one of the pins 42 of the mounting ring 28 and includes a vertical slot 46 parallel to the lifting screw axis 15 connected to a horizontal slot 48 perpendicular to the lifting screw axis 15. (FIG. 4). The slot structure 45 further includes a first vertical wall member 54 and a second vertical wall member 56 adapted for contacting the pin 42 and restraining rotational movement of the auxiliary nut 26 relative to the pin 42. An inclined bottom surface 52 rises from the first vertical wall member 54 until flush with an outer surface 58 of the auxiliary nut 26. (FIG. 5). The auxiliary nut 26 further includes a shoulder portion 60 defining a circumferential wall member 62 engagable with the pins 42 for restraining vertical movement of the auxiliary nut 26 relative to the pins 42 in a direction away from the lifting nut 24.

In a normal mode of operation, as illustrated in FIG. 2, the lifting nut 24 supports the entire weight of the load 22. As the lifting screw 14 rotates, it will move vertically relative to the lifting nut 24 thereby causing the load 22 to be raised or lowered. No portion of the weight of the load 22 is transferred by the lifting screw 14 to the auxiliary nut 26 since no stationary support member, i.e. the support tube 16, vertically supports the auxiliary nut 26. In particular, the wear gap 34 as defined by the predetermined distance "w" separates the auxiliary nut 26 from the lifting nut 24 and support tube 16 thereby preventing force from being transferred from the lifting screw 14 to the auxiliary nut 26. During the normal mode of operation, the auxiliary nut 26 is held against rotation by the pawls 36 of the mounting ring 28 engaging the vertical slots 46 of the auxiliary nut 26. In particular, as the lifting screw 14 rotates in a first direction the auxiliary nut 26 is restrained from movement relative to the lifting nut 24 by each pin 42 engaging the respective first vertical wall member 54. When the lifting screw 14 rotates in a second direction opposite the first direction, each pin 42 engages the respective second vertical wall member 56, thereby preventing rotation of the auxiliary nut 26 relative to the lifting nut 24 in the second direction. (FIGS. 3–4).

Figure 6:
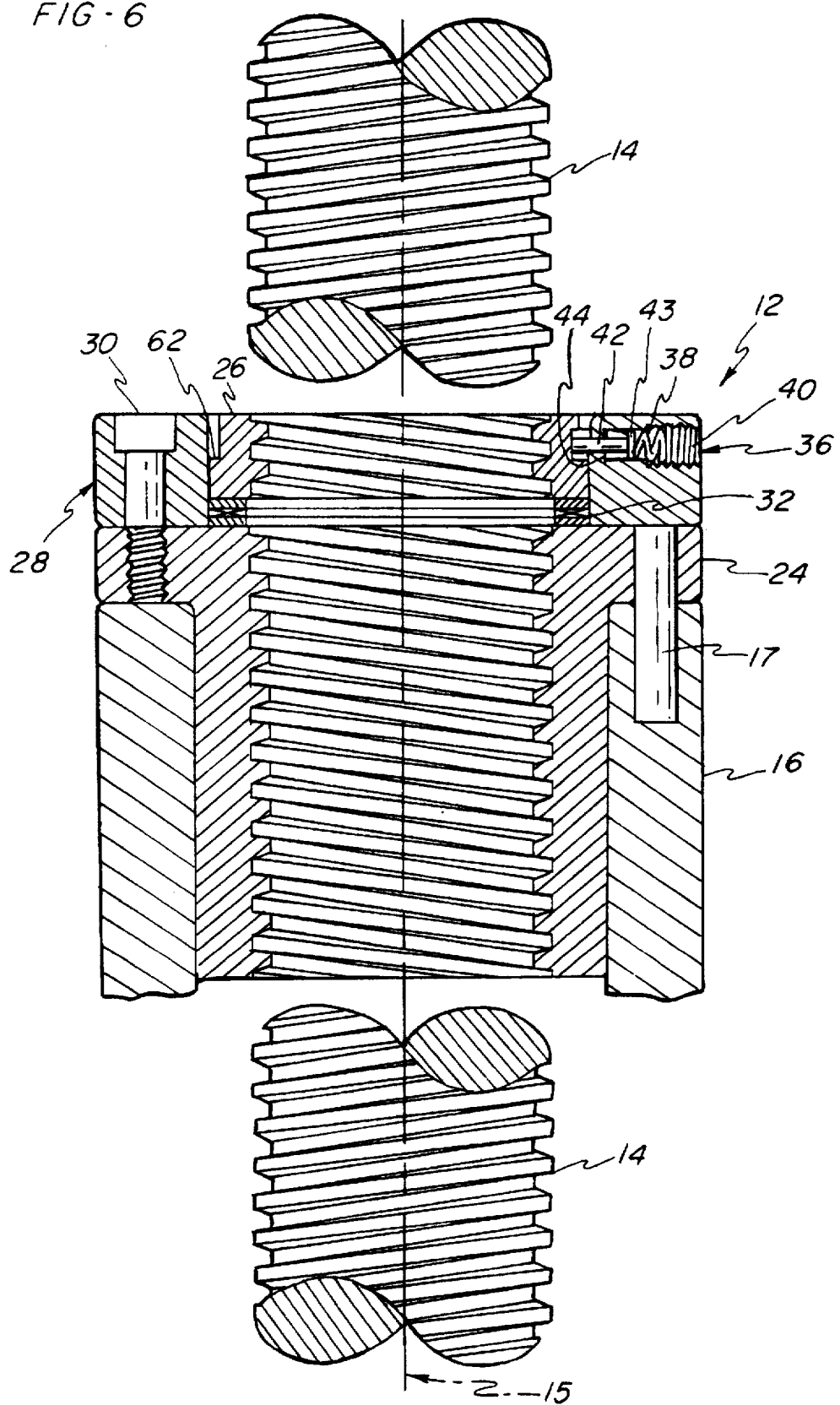
FIG. 6 is a side sectional view of the lifting nut assembly of FIG. 2 illustrating the assembly in a failure mode of operation.

After extended periods of use, the threads of the lifting nut 24 become worn since the lifting nut 24 is made of a softer material than that of the lifting screw 14. As the threads of the lifting nut 24 wear, the threads of the lifting screw 14 will assume a lower position relative to the threads of the lifting nut 24 in response to gravitational force acting on the lifting screw 14 and the load 22. Since the auxiliary nut 26 is threadably engaging the lifting screw 14, it also assumes a lower position relative to the lifting nut 24 thereby reducing the wear gap 34 defined by the predetermined distance "w", as illustrated in FIG. 6. When the wear gap 34 is eliminated, so that the auxiliary nut 26 is supported on the thrust bearing 32, the lift 10 has entered a failure mode of operation in that the lifting nut 24 can no longer safely support the load 22. The auxiliary nut 26 assumes sole support of the weight of the load 22 as transferred from the lifting screw 14.

During the failure mode of operation, the pawls 36 originally engaging the vertical slots 46 have vertically moved relative to the auxiliary nut 26 into engagement with the horizontal slots 48 of the auxiliary nut 26. As the lifting screw 14 rotates in a first direction for lowering the load 22, each pin 42 engages the first vertical wall member 54 thereby preventing rotational movement of the auxiliary nut 26 relative to the lifting nut 24. The lifting screw 14 may therefore rotate relative to the auxiliary nut 26 in the first direction wherein the lifting screw 14 supporting the lifting ram 20 and the load 22 will be lowered. As the lifting screw 14 rotates in a second direction opposite the first direction, each pin 42 cams outwardly against the force of the spring 38 as it travels up the inclined bottom surface 52 of the respective horizontal slot 48, as is illustrated by the position of the pin 42 in FIG. 6. The pins 42 eventually reach the top of the inclined bottom surface 52 where they contact the outer surface 58 of the auxiliary nut 26.

As the pins 42 contact the outer surface 58, the shoulder portion 60 serves to restrain vertical movement of the auxiliary nut 26 in a direction away from the lifting nut 24 should the pins 42 engage the circumferential wall member 62. The shoulder portion 60 thereby prevents the auxiliary nut 26 from becoming disengaged from the mounting ring 28 if an unexpected force is exerted on the lifting screw 14. As the lifting screw 14 continues to rotate in the second direction, each pin 42 maintains contact with the outer surface of the auxiliary nut 26 until it engages the next horizontal slot 48 in response to the inward radial force of the spring 38. In this manner, the auxiliary nut 26 may rotate relative to the lifting nut 24 in the second direction. The lifting screw 14 therefore can not rotate relative to the auxiliary nut 26 whereby the lifting screw 14 supporting the lifting ram 20 and the load 22 can not be raised. Once the lifting nut assembly 12 has been properly repaired and the lifting nut 24 replaced, the lift 10 will again be functional for the normal operation of raising and lowering loads.

Figure 7:
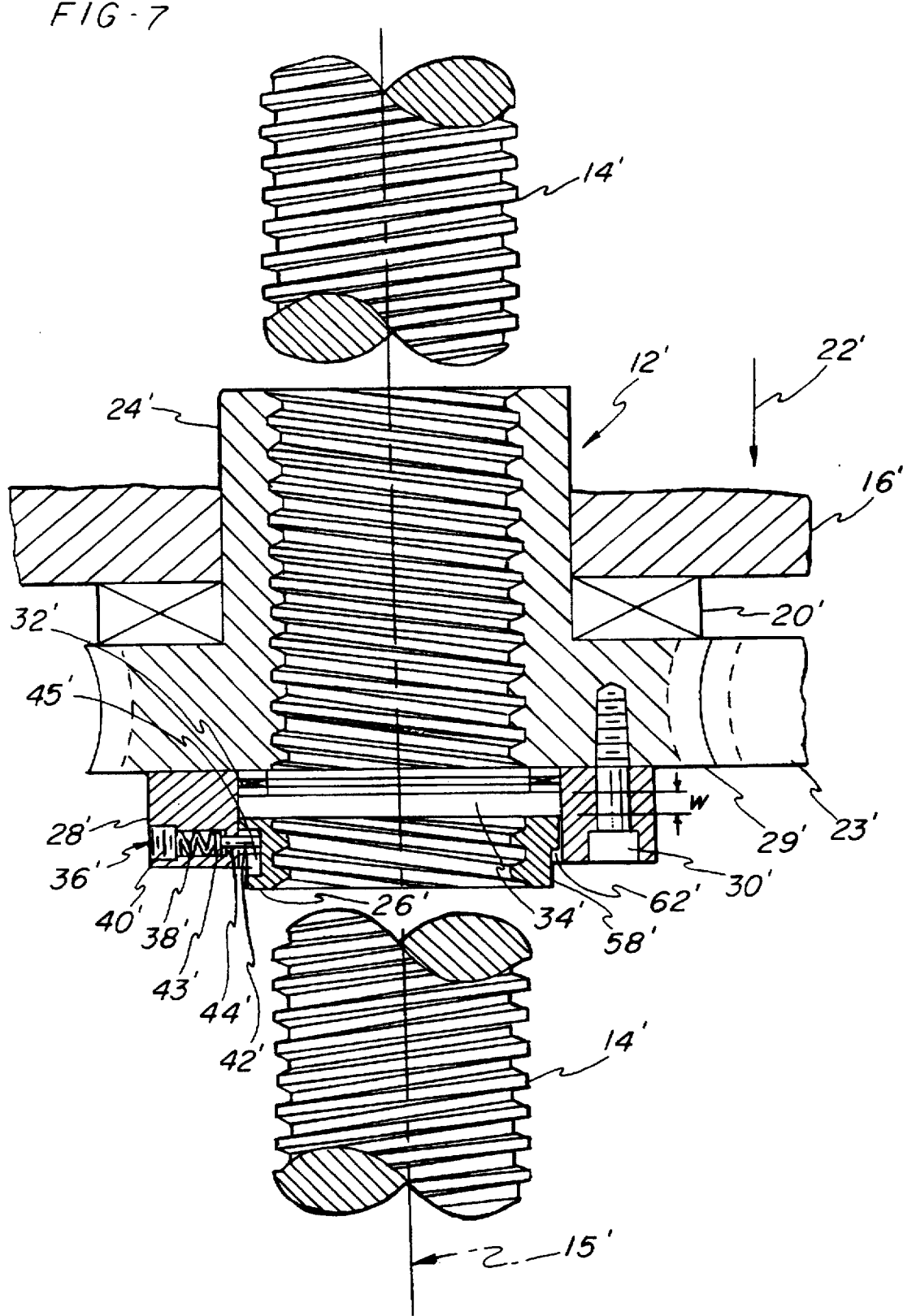
FIG. 7 is a side sectional view of an alternative embodiment of the lifting nut assembly of the present invention.

An alternative embodiment of the present invention is disclosed in FIG. 7. This alternative embodiment comprises a lifting nut assembly 12' oriented 180° from the lifting nut assembly 12 of FIG. 2. The lifting nut assembly 12' threadably engages a lifting screw 14' having a longitudinal screw axis 15'. The lifting nut assembly 12' supports a lifting carriage 16' which is adapted for supporting a load represented by arrow 22'. A bearing 20' separates the lifting carriage 16' from the lifting nut assembly 12'. The lifting screw 14' is fixed from moving while the lifting nut assembly 12' is driven in rotation by a rotating gear 23' powered by a motor (not shown) in a manner well known in the art. As the lifting nut assembly 12' rotates, it travels vertically along the lifting screw 14' thereby raising and lowering the lifting carriage 16' and load 22'.

The lifting nut assembly 12' includes a first or lifting nut 24', a second or auxiliary nut 26', and a mounting ring 28'. The lifting nut 24' threadably engages the lifting screw 14' and has a series of circumferentially disposed teeth 29' meshing with the gear 23'. As the gear 23' rotates, the lifting nut 24' is driven in rotation and thereby travels vertically along the lifting screw 14'. The mounting ring 28' is connected to the lower surface of the lifting nut 24' by a plurality of bolts 30' of the type well known in the art. A thrust bearing 32' is located within the mounting ring 28' wherein the upper surface of the thrust bearing 32' contacts the lower surface of the lifting nut 24'.

The auxiliary nut 26' threadably engages the lifting screw 14' and is located within the mounting ring 28' a predetermined distance "w" below the thrust bearing 32'. The predetermined distance "w" defines a wear gap 34' and is calculated based upon the root of the threads of the lifting nut 24' so that when a permissible maximum wear of the threads of the lifting nut 24' is equaled or exceeded, the lifting nut 24' and the lifting carriage 16' are supported on the auxiliary nut 26'. As mentioned earlier with respect to the first embodiment of the lifting nut assembly 12, the predetermined distance "w" typically equals the root of the threads of the lifting nut 24'.

A plurality of pawls 36' are radially disposed about the mounting ring 28'. The structure of each pawl 36' is identical to pawl 36 as described above with reference to the first embodiment of FIGS. 2–3.

The auxiliary nut 26' includes a ratchet portion defined by a plurality of slot structures 45' similar to slot structures 45 as described earlier with reference to FIGS. 3–5. The only difference between the two slot structures is that the slot structure 45' of the alterative embodiment is rotated 180° from the slot structure 45 of the first embodiment.

Operation of the alternative embodiment of the lifting nut assembly 12' of FIG. 7 is substantially similar to that of the first embodiment of FIGS. 1–6. The only major differences being the 180° rotation in orientation of the lifting nut assembly 12', the fixed lifting screw 14', and the rotating lifting nut 24' which causes the lifting nut assembly 12' to travel vertically along the lifting screw 14'.

From the above description, it should be apparent that the present invention provides a screw type lift having an auxiliary nut assembly for preventing the uncontrolled lowering of a load upon failure of the lifting nut. Furthermore, the present invention provides an auxiliary nut assembly which operates as a ratchet assembly to allow a load to be lowered while preventing further lifting of the load when the lifting nut fails.

While the form of apparatus herein described constitutes a preferred embodiment of this invention, it is to be understood that the invention is not limited to this precise form of apparatus, and that changes may be made therein without departing from the scope of the invention which is defined in the appended claims

What is claimed is:

1. In a load lifting mechanism, including a lifting screw having a longitudinal axis, a lifting nut assembly comprising:

first and second nuts threadably engaging said lifting screw;

a wear gap defining a distance between said first and second nuts, wherein wear of said first nut causes said wear gap to decrease in size;

a ratchet assembly supported on said first and second nuts; and wherein said ratchet assembly restrains said second nut from rotating relative to said first nut in opposing first and second directions during a first mode of operation while said ratchet assembly restrains rotational movement of said second nut relative to said first nut in said first direction and allows rotational movement of said second nut relative to said first nut in said second direction during a second mode of operation.

2. The lifting nut assembly as in claim 1, wherein said first nut comprises a lifting nut supporting a load raised by said load lifting mechanism.

3. The lifting nut assembly as in claim 2, wherein said second nut comprises an auxiliary nut supporting said load during said second mode of operation.

4. The lifting nut assembly as in claim 1, wherein said ratchet assembly comprises a ratchet portion supported on said second nut and a pawl supported on said first nut and aligned for engagement with said ratchet portion.

5. The lifting nut assembly as in claim 4, wherein said pawl comprises a spring biased pin.

6. The lifting nut assembly as in claim 4, wherein said ratchet portion comprises a horizontal slot within said second nut and having an inclined bottom surface for engaging said pawl during said second mode of operation.

7. The lifting nut assembly as in claim 6, wherein said ratchet portion further comprises a vertical slot within said second nut parallel to said lifting screw axis and connected to said horizontal slot, said vertical slot engaging said pawl during said first mode of operation, thereby restraining rotational movement of said second nut relative to said first nut.

8. In a load lifting mechanism, including a lifting screw having a longitudinal axis, a lifting nut assembly comprising:

a lifting nut threadably engaging said lifting screw;

an auxiliary nut threadably engaging said lifting screw;

a wear gap defining a distance between said lifting nut and said auxiliary nut, wherein wear of said lifting nut causes said wear gap to decrease in size;

a ratchet portion supported on said auxiliary nut;

a pawl supported on said lifting nut and aligned for engagement with said ratchet portion; and wherein said ratchet portion and said pawl cooperate to restrain said auxiliary nut from rotating relative to said lifting nut in opposing first and second directions during a first mode of operation while said ratchet portion and said pawl cooperate to restrain rotational movement of said auxiliary nut relative to said lifting nut in said first direction and allow rotational movement of said auxiliary nut relative to said lifting nut in said second direction during a second mode of operation.

9. The lifting nut assembly as in claim 8, wherein said pawl comprises a spring biased pin.

10. The lifting nut assembly as in claim 8, wherein said ratchet portion comprises a horizontal slot within said auxiliary nut having an inclined bottom surface engaging said pawl during said second mode of operation.

11. The lifting nut assembly as in claim 10, wherein said ratchet portion further comprises a vertical slot within said auxiliary nut parallel to said lifting screw axis and connected to said horizontal slot, said vertical slot engaging said pawl during said first mode of operation, thereby restraining rotational movement of said auxiliary nut relative to said lifting nut.

12. A load lifting mechanism comprising:

a lifting screw having a longitudinal axis;

a lifting nut threadably engaging said lifting screw;

an auxiliary nut having a circumferentially disposed horizontal slot with an inclined bottom surface and a vertical slot parallel to said lifting screw axis and connected to said horizontal slot, said auxiliary nut threadably engaging said lifting screw a predetermined distance from said lifting nut, wherein wear of said lifting nut causes said auxiliary nut to displace toward said lifting nut; and a spring biased pin supported on said lifting nut and engaging said vertical slot thereby restraining rotational movement of said auxiliary nut relative to said lifting nut during a first mode of operation, said pin cooperating with said inclined bottom surface of said horizontal slot to restrain rotational movement of said auxiliary nut relative to said lifting nut in a first direction while permitting rotational movement of said auxiliary nut relative to said lifting nut in an opposite second direction during a second mode of operation.

* * * * *